(12) United States Patent
Durgaprasad

(10) Patent No.: US 8,141,037 B2
(45) Date of Patent: *Mar. 20, 2012

(54) TRANSPARENT CONTEXT SWITCHING FOR SOFTWARE CODE

(75) Inventor: Gorti D. Durgaprasad, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1586 days.

This patent is subject to a terminal disclaimer.

(21) Appl. No.: 11/339,588

(22) Filed: Jan. 25, 2006

(65) Prior Publication Data

US 2007/0174328 A1 Jul. 26, 2007

(51) Int. Cl.
*G06F 9/44* (2006.01)
*G06F 9/45* (2006.01)

(52) U.S. Cl. ........ 717/114; 717/106; 717/131; 717/151; 717/153

(58) Field of Classification Search .................. None
See application file for complete search history.

(56) References Cited

U.S. PATENT DOCUMENTS

| 6,108,660 | A  | * | 8/2000  | Ikeda et al. ........................... 1/1 |
| 6,510,448 | B1 | * | 1/2003  | Churchyard .................. 718/108 |
| 6,993,665 | B2 | * | 1/2006  | Heddings et al. ................ 726/21 |
| 7,076,784 | B1 | * | 7/2006  | Russell et al. ................ 719/315 |
| 7,111,290 | B1 | * | 9/2006  | Yates et al. .................... 717/158 |
| 7,137,099 | B2 |   | 11/2006 | Knight et al. |
| 7,478,394 | B1 | * | 1/2009  | de Dinechin et al. ......... 718/108 |
| 2007/0174820 | A1 |  | 7/2007  | Gorti |

* cited by examiner

*Primary Examiner* — Insun Kang
(74) *Attorney, Agent, or Firm* — Wolf, Greenfield & Sacks, P.C.

(57) ABSTRACT

Systems and methods that alleviate programmers of the burden of writing extensive code to implement a context switch for a particular piece of software code. For software code for which a context switch is desired, a declaration of the context and its attributes may be included in the code, along with an indication of the boundaries of the portion of the code to be executed within the context. No further programming for particular piece of code may be necessary in order to implement the context switch. An execution engine may be configured to identify the declaration and the indication of the boundaries, control the generation of the context, and control (or at least initiate) the execution of the software code within the generated context. Thus, from the perspective of the programmer of the piece of code, the context switch may seem transparent.

20 Claims, 6 Drawing Sheets

Object Globalvar x;

Function int f(param2,param3,ref param4)

{

Int localvar = 3;

//Requires a super user or admin permissions or evidence that grants more trust
      //may needs to run in a different process on a different machine
      localvar = Run a shell command(localvar)
      some more code using param2, param3, param4, x.Property and possibly modifying them
      return localvar + x.Property + param2;

Object Globalvar x;

Function int f(param2, param3, ref param4)
{
    Int localvar = 3;

USECONTEXT(``higher privilege'', ``higher trust'', ``machine'')  — 404

{  — 406

Localvar = Run a shell command (localvar)
some more code using param2, param3, param4, x.Property and possibly modifying them
return localvar + x.Property + param2;

TRANSPARENT CONTEXT SWITCHING FOR SOFTWARE CODE

BACKGROUND

Software code typically is executed in a context. As used herein with respect to executing software code, a "context" is a situation, circumstance and/or environment, in terms of software and/or other elements of a computer system, in which software code is executed. A context is typically defined by various combinations of the following: values of variables on a stack; the parameters passed to a function; global and/or static variables; the credentials of the process and/or the thread in which the software code is executed; evidence of the code (e.g., the author of the code; where the code is being loaded from, etc.); associated tokens of the process (e.g., the user under whose credentials the process is running); environmental variables of the environment under which the software is running; granular permissions granted by the execution engine; the machine on which the code is running; and other items.

Software code (often referred to herein as simply "code") running in a given context might need to change to a different context to accomplish its programmed task. A change to a different context is often refined to herein as a "context switch." For example, a user under which a process is running could be a machine administrator, but the execution engine decides to deny the file I/O permissions based on the identity of the code it is running. Identity of the code is typically determined by the author of the code, where it is downloaded from, etc. For example, an administrator running a web page may download a piece of software from the Internet. Even through the user's access permissions allow reads and writes of the file system (e.g., because she is an administrator on the machine), the execution engine could determine that the software downloaded is from a third party and the third party cannot be established as "trusted." Thus, the execution engine can prevent the download software from accessing the file system. In a Common Language Runtime (CLR) environment, this prevention is achieved through the code access permissions (CAS) subsystem.

A software application is sometimes artificially separated from one or more of its components because the components need to run in different contexts. For example, consider a software application that has a user interface component that runs under the interactive user account and a "daemon" or "service" component that runs under the system account. Perhaps the software application designer separated these components because the "service" needs to operate under "system" account so that it can run at a higher privilege than the user interface component that runs under interactive user. A software developer must develop code to establish communication channels between the interactive component and the service component, and manage the data that is sent back and forth.

For example, consider the pseudo-code 100 in FIG. 1. Pseudo-code portion 102 requires a higher privilege and/or more trust than the remainder of the pseudo-code, and may need to run in a different process and perhaps on a different machine. It is also conceivable that the code requires lower privileges or lower trust and needs to run in a different application domain in the same process—perhaps for security reasons. Thus, there is a need to implement a context switch.

In order to actually code the pseudo-code 100 to implement a context switch using known technologies (e.g., NET remoting, Simple Object Access Protocol (SOAP), Component Object Model (COM), Remote Procedure Call (RPC), etc), programmers need to do one or more of the following:
1. Package the code portion 102 into a different process, assembly and/or module;
2. Load the module into the required process and/or application domain;
3. Set up some kind of inter/intra process communication to send the parameters to the required process and/or application domain and get the results back; and
4. Harvest the results.

FIG. 2 illustrates an example of one known solution 200 for programming a context switch. Solution 200 includes two pseudo-code portions 201 and 206 to be executed in different contexts. Portion 200 includes a function call 204 to portion 206, which may be part of a separate application domain, package and/or assembly, and may be configured to execute as part of a separate process or thread, and may reside on a different computer or computer component.

A non-trivial amount of code needs to be written to implement the execution of code portions 201 and 206 in separate contexts. First, portions 201 and 206 must be created as two separate and distinct entities, e.g., an object and a function called from within the object as shown in FIG. 2. Portion 201 must be configured as illustrated by pseudo-code 202 to repackage communication code and set-up channels, and may be configured to convert arguments into different data types, before calling portion 206. Further, the call itself (204) must be coded, as does the harvesting of the results from the call.

Programming such context switches not only disrupts the flow of programming, but Requires knowledge of the specific technologies involved in doing so. Further, the Programming of context switches tends to be repetitive and serves no direct purpose in Realizing the logic of the application for which it being used. Developers or programmers (hereinafter "programmers") often must write such code, which is an inefficient use of their time and reduces their productivity.

SUMMARY

This Summary provides an illustrative context for aspects of the invention, in a simplified form, and is not intended to be used to limit the scope of the claimed subject matter. These and other aspects of the invention are described more fully below in the Detailed Description.

Described herein are systems and methods that alleviate programmers of the burden of writing extensive code to implement a context switch for a particular piece of software code. For software code for which a context switch is desired, a declaration of the context and its attributes may be included in the code, along with an indication of the boundaries of the portion of the code to be executed within the context. No further programming for the particular piece of code may be necessary in order to implement the context switch. An execution engine may be configured to identify the declaration and the indication of the boundaries, control the generation of the context, and control (or at least initiate) the execution of the software code within the generated context. Thus, from the perspective of the programmer of the piece of code, the context switch may seem transparent.

To generate the context, the execution engine may provide context parameter values to a context provider module. The context provider module may determine and retrieve a pre-defined context abstraction that matches the parameter values, or create a context abstraction based, at least in part, on the context parameter values. The context provider module may provide the generated or retrieved context abstraction to the execution module, from which the context may be generated and code executed therein.

An information source may be provided that includes a data structure including a plurality of entries, each entry including a context abstraction defining a respective context. For example, the data structure may be implemented using one or more XML files or may be part of a Windows® registry. In response to receiving context attributes from an execution engine, the context provider module may retrieve the context abstraction defining a context to be generated and pass the context abstraction to the execution engine.

In some embodiments, the only extra coding required by a programmer to program a context switch is writing the context declaration and at least one boundary indicator, and the execution engine takes care of the rest. As a result, programmers write less code, and are more productive. Programmers also may enjoy a logical flow of programming that does not involve coding one or more technology-specific context switches.

Programmers may employ a method of creating software code that includes at least one portion to be executed in a particular context. The software code may be initially written irrespective of any context switch; i.e., as if all of the code is to be executed in a same context. At least one boundary indicator then may be inserted into the software code (e.g., using one or more particular characters) to indicate the at least portion to be executed in the particular context, and a declaration of the context may be written into the software code.

In an embodiment of the invention, a context switch is executed for first software code. The software code includes a context declaration declaring a context, second software code to be executed within the context, and at least one indication of a boundary of the second software code within the first software code. The context declaration is interpreted, and the boundary of the second software code identified. The generation of the context specified by the context declaration is controlled, and execution of the second software code within the generated context is initiated.

In an aspect of this embodiment, the second software code is analyzed, including determining at least one parameter of the first software code that is used by the second software code.

In another aspect of this embodiment, the second software code, the at least one parameter and a value of the at least one parameter are transported into the generated context.

In another aspect of this embodiment, the second software code is transported into the generated context.

In yet another aspect of this embodiment, executing the second software code in the context generates results, and a first portion of the first software code is executed in another context. Further, the generated results are transported back into the other context.

In another aspect of this embodiment, a second portion of the first software code is executed in the other context after executing the second software code.

In another aspect of this embodiment, the context declaration specifies a privilege and/or trust, and generating the context includes controlling generation of the context based at least in part on the specified privilege and/or trust.

In another aspect of this embodiment, generating the context includes determining at least one parameter to be used in the context and initiating an identification of a predefined context based on the at least one parameter and/or a creation of the context based on the at least one parameter.

One or more acts of the preceding embodiment and/or one or more aspects thereof may be implemented using a computer or other type of computational system.

Aspects of this embodiment of the invention include any suitable combination of the foregoing aspects and/or variations thereof.

In another embodiment of the invention, a computer program is provided that includes instructions that, as a result of being executed by a computer, instruct the computer to perform the method of the embodiment of the invention described in the preceding paragraphs and/or one or more aspects thereof described in the preceding paragraphs.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system for executing a context switch for first software code is provided. The first software code includes a context declaration declaring a context, second software code to be executed within the context, and at least one indication of a boundary of the second software code within the first software code. The system includes an execution engine to control execution of the first software code, including interpreting the context declaration, identifying the boundary of the second software code, controlling generation of the context specified by the context declaration, and initiating execution of the second software code within the generated context.

In an aspect of this embodiment, the execution engine includes a context code analyzer operative to analyze the second software code and determine at least one parameter of the first software code that is used by the second software code.

In another aspect of this embodiment, the execution engine is operative to transport the second software code, the at least one parameter and a value of the at least one parameter into the generated context.

In yet another aspect of this embodiment, the declaration specifies at least one attribute of the context, and the execution engine is operative to control the generation of the context based at least in part on the at least one attribute.

In another aspect of this embodiment, the declaration specifies at least one attribute of the context, and the execution engine is operative to control the generation of the context based at least in part on the at least one attribute.

In another aspect of this embodiment, the execution engine is operative to execute a first portion of the first software code in another context, followed by the execution of the second software code, the execution of the second software code generates results, and the execution engine is operative to transport the generated results into the other context.

In another aspect of this embodiment, the execution engine is operative to execute a second portion of the first software code following the execution of the second software code, and executing the second portion includes using the generated results.

In another aspect of this embodiment, the context declaration specifies a privilege and/or trust, and the execution engine is operative to generate the context based at least in part on the specified privilege and/or trust.

In another aspect of this embodiment, the system includes a context provider module, the execution engine is operative to provide a value for at least one parameter of the context to the context provider, and the context provider module is operative to identify a predefined context abstraction defining the context based on the at least one parameter and/or create a context abstraction defining the context based on the at least one parameter, and to provide the context abstraction to the execution engine.

In another embodiment of the invention, a computer program product is provided, including at least one computer-readable medium; and computer-readable signals, stored on the at least one computer-readable medium. The computer-readable signals define instructions that, as a result of being executed by a computer, control the computer to execute a context switch that includes executing a first portion of the instructions in a first context and a second portion of the instructions in a second context. The instructions include a context declaration declaring the second context, and at least one indication of a boundary of the second portion of the instructions to be executed in the second context.

In an aspect of this embodiment, the context declaration specifies at least one attribute of the context.

In another aspect of this embodiment, the at least one indication includes an indication of the beginning of the second portion and a separate indication of the end of the second portion.

In yet another aspect of this embodiment, the context declaration and the at least one indication are included within the first portion.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 1 is pseudo-code illustrating an example of a known solution for programming a context switch;

FIG. 4 is pseudo-code illustrating an example of software code defining a context switch using a context declaration and at least one context boundary indicator, according to some embodiments of the invention;

DETAILED DESCRIPTION

Described below are embodiments of the invention for generating a context, and executing software code within the generated context. As used herein, the phrase "executing code within a context" and derivatives thereof is synonymous with the phrase "applying a context to code." Executing code within a context may include, among other acts, any of: applying context-specific values to the execution of the code; executing the code within a process and/or thread defined for the context, executing the code on a computer (or other machine or computational device) or component thereof defined for the context, executing the code as part of a particular package, assembly, application domain or other logical construct defined for the context; and any suitable combination of the foregoing.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 2:
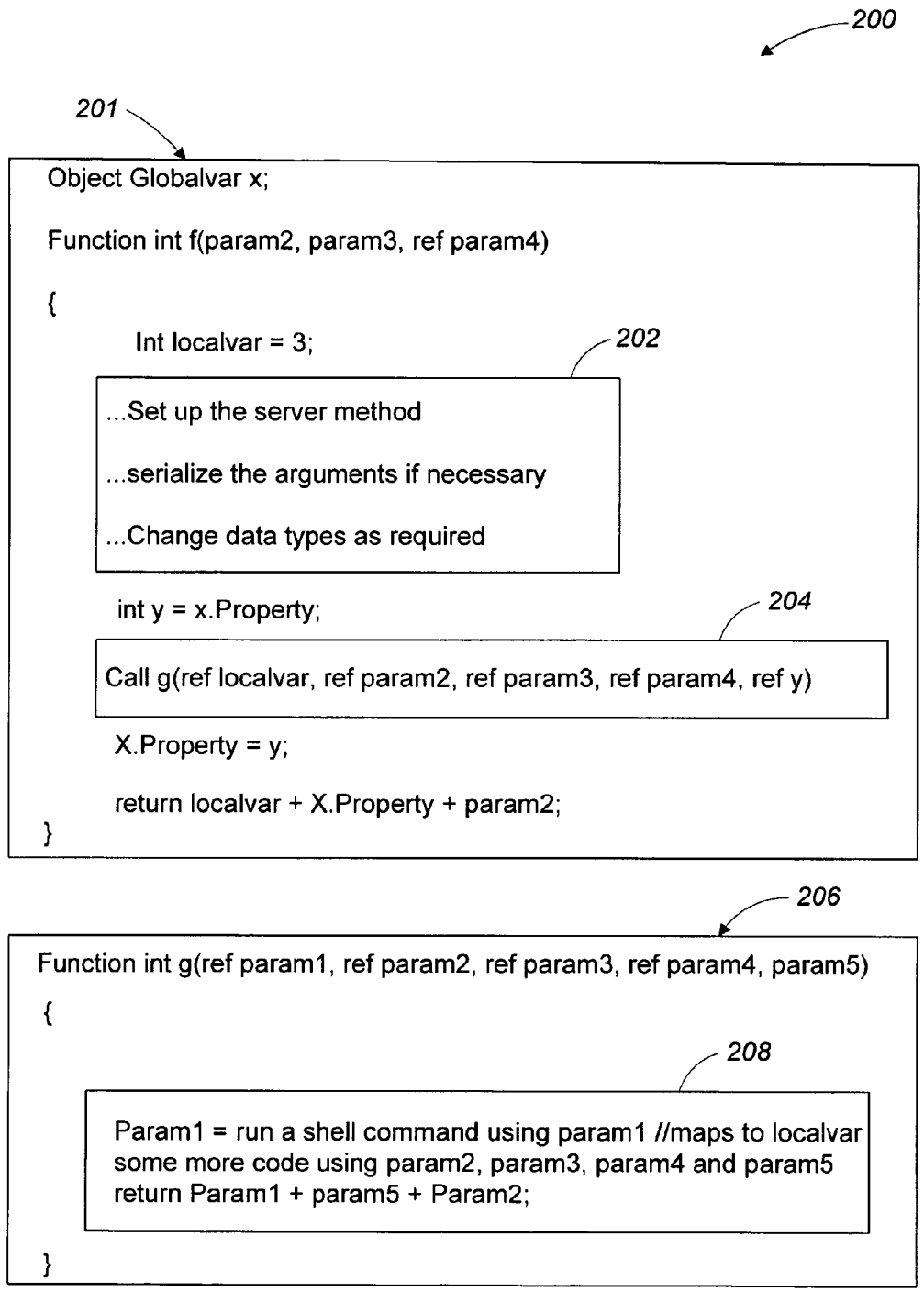
FIG. 2 is pseudo-code illustrating an example of a known solution for programming a context switch.
Figure 3:
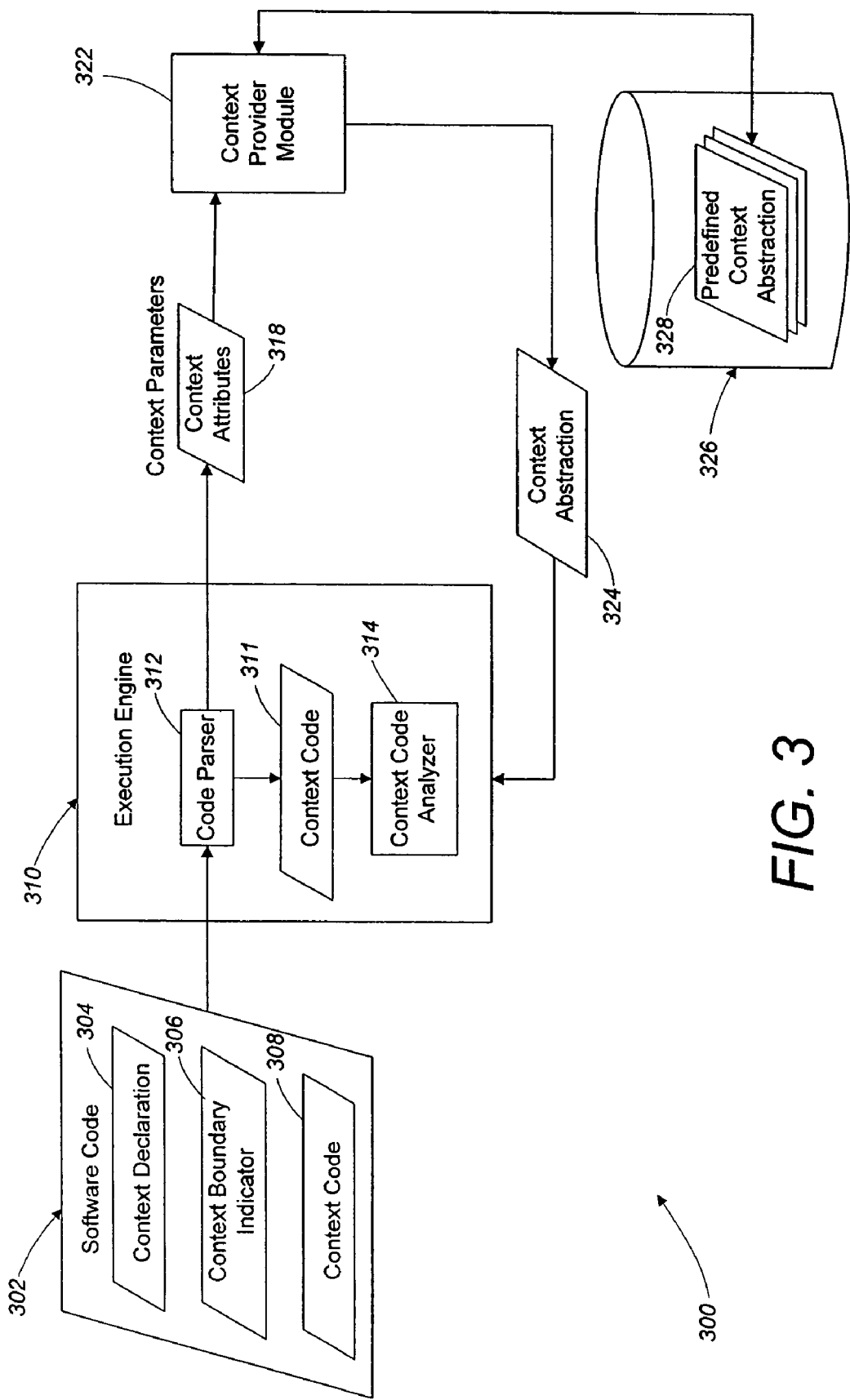
FIG. 3 is a block diagram illustrating an example of a system for executing a context switch based at least in part on a declared context and at least one context boundary indicator.

FIG. 3 is a block diagram illustrating an example of a system 300 for executing a context switch based at least in part on a declared context and at least one context boundary indicator, according to some embodiments of the invention. System 300 is not intended to limit the scope of the invention, as any of numerous other implementations of a system for executing a context switch, for example, variations of system 300, are possible and are intended to fall within the scope of the invention.

System 300 may include any of: execution engine 310; context provider module 322; information source 326; one or more other components; and any suitable combination of the foregoing.

Execution engine 310 may be configured to receive software code 302 and execute it. Code 302 may include any of: context declaration 304; at least one context boundary indicator 306; context code 308; other elements; and any suitable combination of the foregoing. It should be appreciated that portions of software code 302 (not shown), in some cases the bulk of code 302, may be completely unrelated to the context corresponding to context-related elements 304, 306 and 308.

Context declaration 304 may declare a context and may specify one or more attributes of the context. For example, the one or more attributes may include any of: a privilege; a trust; a user; a machine (e.g., computer or other computation device); a process; a thread; an application domain, other attributes; and any suitable combination of the foregoing. A privilege is typically specific to a user or a group of users. A trust may be specific to a portion of code and may be specified as a list of one or more permissions associated with the code. There may be multiple possible levels of trust that may be specified in a context declaration.

The at least one context boundary indicator may specify one or more boundaries (e.g., beginning and/or end) of the context code—i.e., the code to be executed within the context. A boundary indicator may be any of a variety of characters such as, for example, a bracket, a parentheses, a curly brace (e.g., "{" or "}"), an asterisk, other character, or any suitable combination of the foregoing. Further, the position of the boundary indicator within the code in relation to the position of the context declaration (e.g., immediately following the context declaration) also may serve to identify the context code. A character should be used that is not reserved for other operations, functions or values in the programming language in which the code is written.

Further, context declaration 304 may specify the identification of a context, which can be used by a context provider to retrieve a context abstraction from an information source, from which the identified context can be generated, as described below in relation to context provider module 322.

Digressing briefly from FIG. 3, FIG. 4 is pseudo-code illustrating an example of software code defining a context switch using a context declaration and at least one context boundary indicator, according to some embodiments of the invention. Pseudo-code 400 is not intended to limit the scope of the invention, as any of numerous other implementations of software code defining a context switch, for example, variations of pseudo-code 400, are possible and are intended to fall within the scope of the invention.

Pseudo-code 400 may include code portion 402, which may include any of: context declaration 404; context boundary indicators 406, 408 and context code 410. As illustrated in FIG. 4, in some embodiments of the invention, the term "USECONTEXT" is used to declare a context. Other terms may be used. The example of declaration 404 illustrates that the context attributes may specify a higher privilege (than the context currently being executed), a higher trust and a machine. For example, the context declaration may read as follows:

```
USECONTEXT(privilege=1 trust=5
    machine=administrator).
```

Returning to FIG. 3, software code 302 (e.g., pseudo-code 400) may have been generated by a programmer using any of a variety of methodologies or techniques. For example, a programmer may have initially written software code 302 to include context code 308, (e.g., context code 410) but not context declaration 304 where one or more context boundary indicators 306. For example, the programmer may have written software code 302 irrespective of any context switch; i.e., as if all of software code 302 was to be executed in a same context. The programmer then may determine which, if any, portions of software code 302, for example, context code 308, is to be executed in a different context. The programmer then may insert one or more boundary indicators 306 (e.g., indicators 406 and 408) into the software code to indicate that context code 308 is to be executed in a different context. Further, the programmer may write context declaration 304 (e.g., declaration 404) to declare that a context switch is to occur and specify the one or more attributes of the context in which the context code 308 is to be executed.

Execution engine 310 may be configured to receive software code and execute it. Execution engine 310 may serve as an interface between software code and a processor executing the code; i.e., the processor may run native code and the execution engine may provide additional services. Execution engine may be any of a variety of types of execution engines such as, for example, a virtual machine (e.g., a Java™ Virtual Machine), a Common Language Runtime (CLR) engine (e.g., NET CLR) or another software entity that is operative to provide run-time services to other software (e.g., managed applications).

Execution engine 310 may include a code parser 312 that is configured to recognize context declaration 304 and/or the at least one context boundary indicator 306. During the parsing of code 302, when code parser 312 identifies context declaration 304 and/or context boundary indicator 306, it sends context code 312 to context code analyzer 314. Analyzer 314 analyzes the context code and determines the parameters of code 302 to be passed into the new context (i.e., the context-passed parameters). The context-passed parameters may include any of: local variables; static variables; global variables; function parameters; other parameters, and any suitable combination of the foregoing. Code parser 312 or another component of execution engine 310 may be configured to determine the context attributes specified in the context declaration, for example, any of the context attributes described above in relation to context declaration 304.

Execution engine 310 may be configured to control the generation of the context specified in the context declaration 304. This generation may include performance of the tasks that would have to be hand-coded in known systems such as, for example, packaging and repackaging communication code; setting up communication channels, converting arguments into different data types; making function calls, harvesting the results of such calls, etc. Execution engine 310 may be configured to invoke context provider module 322, and to pass it context attributes 318.

Context provider module 322 may be configured to identify and retrieve a predefined context abstraction that matches the context attributes 318 provided by the execution engine. A context abstraction is an abstraction that defines the information necessary to generate a context. For example, a context abstraction may define any of: values of variables for a stack; parameters to be passed to a function; global and/or static variables; the credentials of a process and/or a thread for the context; evidence of code to be executed in the context (e.g., the author of the code, where the code is to be loaded from, etc.); tokens associated with the process or the context (e.g., the user under whose credentials the process is to be executed); environmental variables of the environment for the context; granular permissions; the machine on which the context is to executed; other items; or any suitable combination of the foregoing.

For example, context attributes 318 may specify a particular machine and a particular privilege. Context provider module 322 may determine whether any of context abstractions 328 stored in information source 326 correspond to (e.g., match) the specified machine and privilege. Information source 326 may include a data structure comprising one or more entries, each entry including a context abstraction defining a context, and may include one or more XML files, a Windows® registry, another type of database or any suitable combination of the foregoing. If a match is found, context provider may send the determined context abstraction 324 to execution engine 310. As noted above, in some embodiments the context declaration 304 includes an identifier (e.g., a name) of a context. In such embodiments, the identifier of the context may be included in context attributes 318 provided to context provider 322, and the context provider module may use the context identifier to retrieve the predefined context abstraction 328 identified by the context identifier.

If no match is found, context provider module 322 may generate a context abstraction according to the received context attributes 318. For example, context provider 322 may be configured with or have access to information that can be indexed using received context attributes and used to generate a context abstraction.

Execution engine 310 may be configured to generate a context based on the provided context abstraction 324, to activate it and to control (or at least initiate) an execution of context code 308 within the generated context. Controlling the execution may include transporting the context code 308 and the context-passed parameters determined by context code analyzer 314 into the generated context, which may include creating the stack frame and global/static environment of the context. Transporting the context code may include creating a new assembly or an executable image, setting up memory, data and other aspects of the context environment so the context code can access the local, static and global variables as if there was only a single execution flow, and dynamically loading the created assembly or executable image into the new context. Execution engine 310 may be configured to transport and integrate the results of executing the code in the generated context back into the context in which the remainder of code 302 is executed (assuming no other defined context switches, which is possible).

In some embodiments of the invention, context code 308 may include another context declaration, one or more other context boundary indicators and other context code. Further, this other context code may include yet another context declaration, one or more boundary indicators and context code, etc., thereby defining one or more nested context switches within software code 302. In such embodiments, execution engine 310 (and/or one or more other execution engines used as part of implementing a context switch) may be configured to execute another context switch during the execution of context code 308 within a generated context. Executing these one or more other context switches may be performed at least similarly to the execution of the initial context switch described above and described below in relation to FIG. 5.

In some embodiments, context declaration 304 may specify multiple contexts. For example, context declaration 304 may read as follows:

USECONTEXT("Context=UserAccountContext,
        User=System,Password=abc",
        "Context=PartialTrustContext,
        Permission=FileIO,Permission=Registry")

In this example, a first context is declared having an identifier of "UserAccountProvider", and specifying a user of "system" and a password of "abc", and a second context is declared having an identifier of "PartialTrustProvider," a permission of "FileIO" and a permission of "Registry". It should be appreciated that context declaration 304 may declare more than two contexts.

Execution engine 310 may be configured to interpret the specification of multiple contexts within a context declaration as meaning that one or more contexts should be generated from within one or more other contexts, for example, in an order in which the contexts are declared within the context declaration. That is, execution engine 310 may be configured to interpret the declaration of multiple contexts within a context declaration as the declaration of a context switch chain. For example, execution engine and the components thereof may be configured to execute the context switch for the context declared first within the context declaration 304. Then, from within the context generated as part of executing this context switch, a second context switch may be executed for the second context declared within the context declaration. This process may be repeated for any additional context declared within the context declaration, for example, in an order in which the context are specified within the declaration.

It may be desirable to use context switch chains so that context abstractions (e.g., abstractions 328) can be organized in an object-oriented and/or hierarchical fashion. For example, a first context abstraction can be defined for when user="system" and password="abc," for example, the context identified above as "UserAccountProvider." Further, multiple other context abstractions may be defined for different permissions when the user="system" and the password="abc." For example, a context abstraction may be defined for the context identified above as "PartialTrustProvider," for which permissions are "FileIO" and "Registry."

A software product that includes the execution engine 310 and the context provider 316 also may include (e.g., be shipped and/or packaged with) one or more predefined context abstractions. Further, such a product may be configured to be extensible such that other context abstractions can be defined by programmers for the owner or licensee of the product.

System 300, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 300 may reside on a single device (e.g., a computer), or one or more components may reside on separate, discrete devices. Further, each component may be distributed across multiple devices, and one or more of the devices may be interconnected.

Further, on each of the one or more devices that include one or more components of system 300, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 300, and components thereof, may be implemented using a computer system such as that described below in relation to FIGS. 6 and 7.

Figure 5:
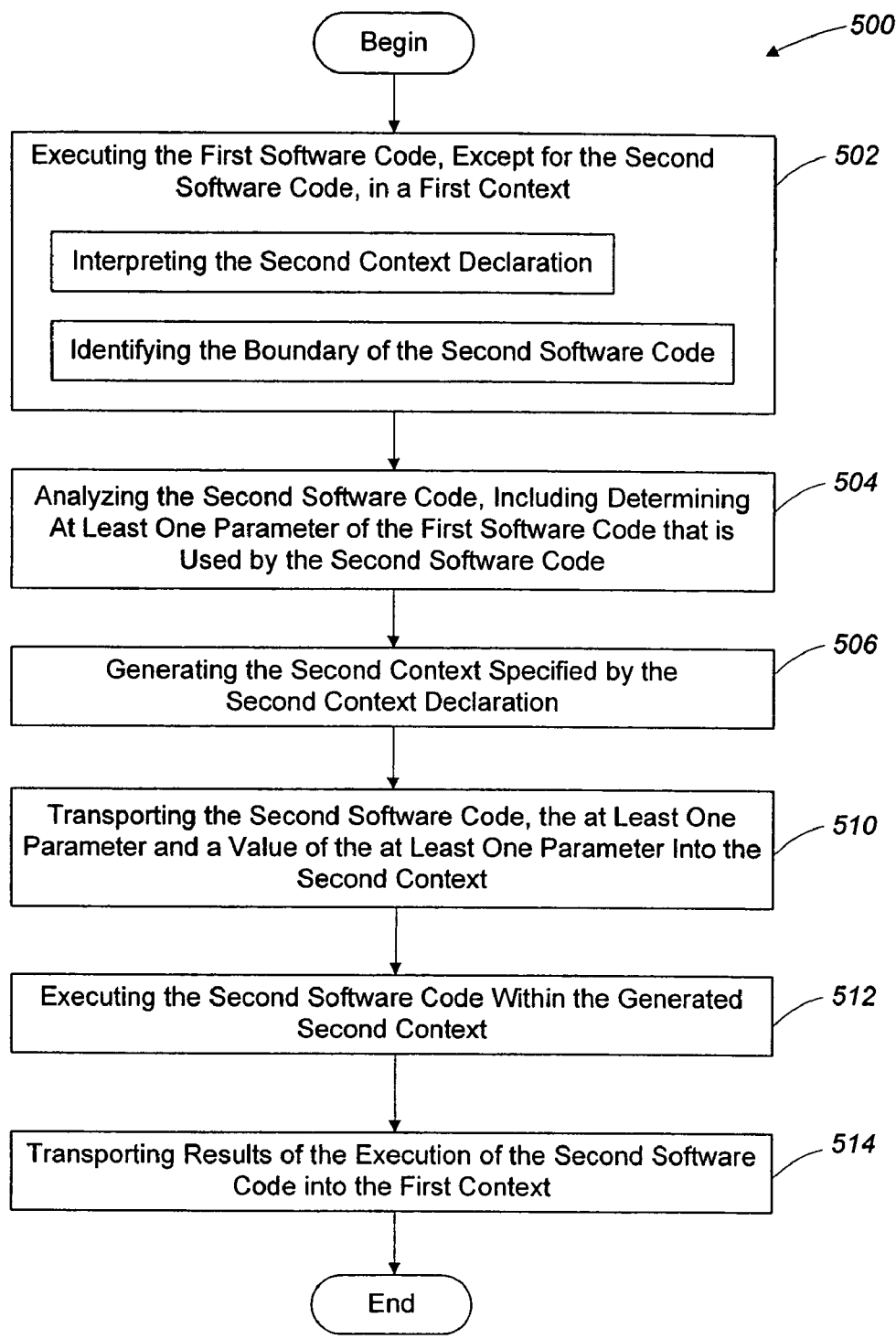
FIG. 5 is a flowchart illustrating an example of a method of executing a context switch based at least in part on a declared context and at least one context boundary indicator, according to some embodiments of the invention.

FIG. 5 is a flowchart illustrating an example of a method 500 of executing a context switch based at least in part on a declared context and at least one context boundary indicator, according to some embodiments of the invention. Method 500 is not intended to limit the scope of the invention, as any of numerous other implementations of executing a context switch, for example, variations of method 500, are possible and are intended to fall within the scope of the invention. Method 500 and/or acts thereof may be performed by system 300 and/or components thereof in accordance with the descriptions thereof above.

First software code (e.g., code 302) including (e.g., containing) second software code (e.g., context code 308) may be received (not shown), for example, by execution engine 310 described above in relation to FIG. 3. The first software code may include a context declaration (e.g., context declaration 304) declaring a second context in which to execute second software code, and may include at least one context boundary indicator (e.g., indicator 306) specifying at least one boundary of the second software code. Further, as described above in relation to FIG. 3, the context declaration may define multiple contexts resulting in a context switch chain.

In Act 502, the first software code, except for the second software code, may be executed in a first context. This execution may include interpreting the second context declaration and/or identifying the boundary of the second software code, for example, by a code parser such as code parser 312 described above in relation to FIG. 3.

In Act 504, the second software code may be analyzed, including determining at least one parameter of the first software code that is used by the second software code. This analysis may be performed, for example, by a context code analyzer such as analyzer 314, as described above in relation to FIG. 3.

In Act 506, the second context specified by the second context declaration may be generated, for example, as described above in relation to FIG. 3. This generation may include determining a context abstraction based on context attributes specified in the context declaration, for example, by context provider module 322 as described above in relation to FIG. 3. The context attributes may be used to generate a context abstraction or to retrieve a context abstraction from an information source that includes one or more predefined context abstractions (e.g., information source 326).

In Act 510, the second software code, the at least one parameter and a value of the at least one parameter may be transported into the second context, for example, as described above in relation to FIG. 3. The context then may be initialized using values of the context-passed parameters and/or values defined by a context abstraction used to generate the context. In Act 512, the second software code may be executed within the generated second context.

In Act 514, the results of the execution of the second software code may be transported into the first context, and execution of the remainder of the first software code in the first context may resume. As described above in relation to FIG. 3, context code 308 may itself include a context declaration, one or more context boundary indicators and other context code, in a sort of nested context arrangement. In such embodiments, Act 512 may include repeating Acts 504-514 for the other context code, initiating the performance of these acts within the generated second context.

In some embodiments, generating the context and controlling execution of context code 312 within the generated context may include use of another execution engine within the generated context. That is, execution engine 310 may be configured to generate another execution engine and/or invoke an existing execution engine, and this other execution engine may be configured to control the execution of the context code 308 in another context, including performing one or more of the tasks described above that may be involved in controlling execution.

Method 500 may include additional acts. Further, the order of the acts performed as part of method 500 is not limited to the order illustrated in FIG. 5, as the acts may be performed in other orders and/or one or more of the acts may be performed in series or in parallel, at least partially.

Prior to the performance of method 500, a programmer may initially write the first software code as if there is one single execution flow. The programmer then may mark (i.e., scope) portions (i.e., blocks) of code that need to run in a different context with one or more particular characters such as, for example, squiggly braces "{ }", and declare the context attributes, for example, using the term USECONTEXT, as described above.

Method 500, acts thereof, and various embodiments and variations of this method and these acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 500, or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 300, 600 and 700 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 6:
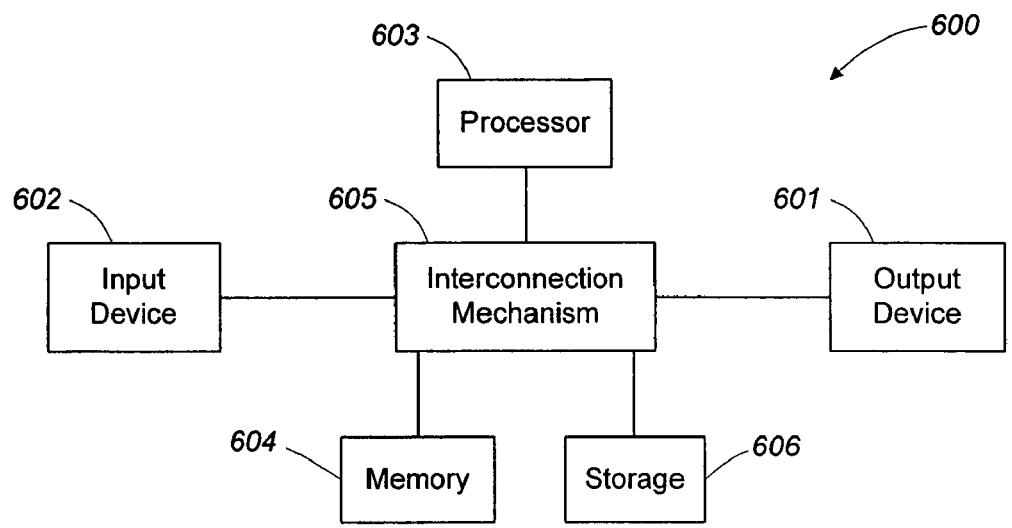
FIG. 6 is a block diagram illustrating an example of a computer system on which some embodiments of the invention may be implemented.
Figure 7:
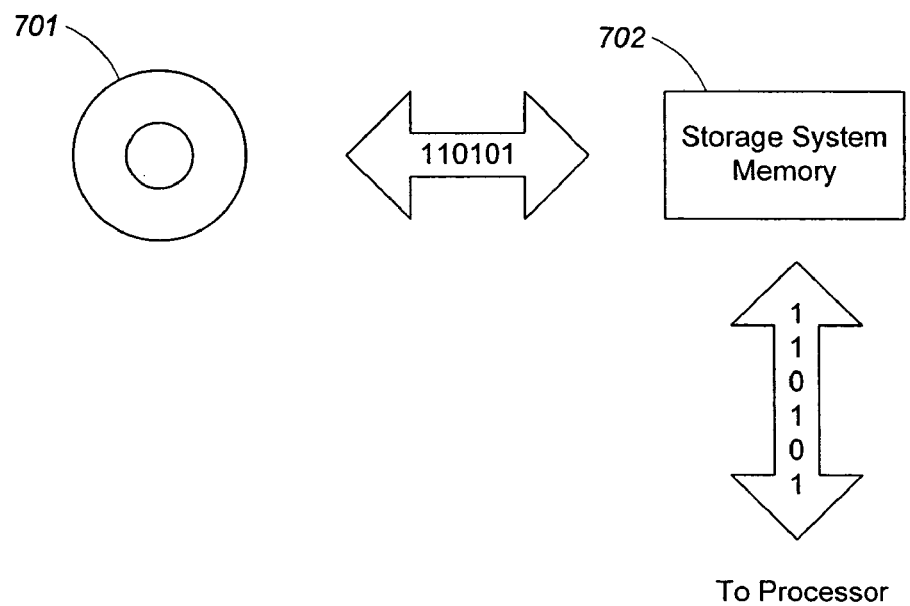
FIG. 7 is a block diagram illustrating an example of a storage system that may be used as part of the computer system to implement some embodiments of the invention.

It should be appreciated that any single component or collection of multiple components of a computer system, for example, the computer system described in relation to FIGS. 6 and 7, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 600 such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism 605).

The storage system 606, shown in greater detail in FIG. 7, typically includes a computer readable and writeable nonvolatile recording medium 701 in which signals are stored that define a program to be executed by the processor or information stored on or in the medium 701 to be processed by the program. The medium may, for example, be a disk or flash memory. Typically, in operation, the processor causes data to be read from the nonvolatile recording medium 701 into another memory 702 that allows for faster access to the information by the processor than does the medium 701. This memory 702 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 1102 and then copies the data to the medium 1101 after processing is completed. A variety of mechanisms are known for managing data movement between the medium 1101 and the integrated circuit memory element 604, 1102, and the invention is not limited thereto. The invention is not limited to a particular memory system 604 or storage system 606.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 600 may be a general-purpose computer system that is programmable using a high-level computer programming language. Computer system 600 also may be implemented using specially-programmed, special-purpose hardware. In computer system 600, processor 603 is typically a commercially available processor such as any of the well-known Pentium class processors available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of executing a context switch for first software code, comprising:
    providing software code including the first software code and a context declaration declaring a context and including one or more context attributes, the software code further including second software code to be executed within the context and at least one indication of a boundary of the second software code within the first software code;
    interpreting, by an execution engine at runtime, the context declaration and the at least one boundary indication;
    identifying, by the execution engine at runtime, the boundary of the second software code based on the at least one boundary indication included in the software code;
    controlling, by the execution engine at runtime, generation of the context specified by the context declaration, the generation of the context including determining a context abstraction based on the one or more context attributes specified in the context declaration; and
    initiating execution of the second software code within the generated context using values defined by the context abstraction.

2. The method of claim 1, further comprising:
    analyzing the second software code, including determining at least one parameter of the first software code that is used by the second software code.

3. The method of claim 2, further comprising:
    transporting the second software code, the at least one parameter and a value of the at least one parameter into the generated context.

4. The method of claim 1, further comprising:
    transporting the second software code into the generated context.

5. The method of claim 1, further comprising:
    transporting results generated by execution of the second software code into the generated context.

6. The method of claim 5, further comprising:
    executing a second portion of the first software code in the generated context after transporting results into the generated context.

7. The method of claim 1, wherein the context declaration specifies a privilege and/or trust, and
    wherein controlling generation of the context comprises controlling generation of the context based at least in part on the specified privilege and/or trust.

8. The method of claim 1, wherein controlling generation of the context comprises determining at least one parameter to be used in the context, and initiating an identification of a predefined context based on the at least one parameter and/or a creation of the context based on the at least one parameter.

9. The method of claim 1, wherein the one or more context attributes include one or more of a user, a machine, a process, a thread, and an application domain.

10. The method of claim 9, wherein the context abstraction defines one or more of values of variables for a stack, parameters to be passed to a function, global and/or static variables, the credentials of a process and/or a thread for the context, evidence of code to be executed in the context, tokens associated with the process or the context, environmental variables of the environment for the context, granular permissions, and the machine on which the context is to be executed.

11. A computer-readable storage medium encoded with instructions that, as a result of being executed by a computer, control the computer to perform a process of executing a context switch for first software code, comprising:
    providing software code including the first software code and a context declaration declaring a context and including one or more context attributes, the software code further including second software code to be executed within the context and at least one indication of a boundary of the second software code within the first software code;
    interpreting, by an execution engine at runtime, the context declaration and the at least one boundary indication;
    identifying, by the execution engine at runtime, the boundary of the second software code based on the at least one boundary indication included in the software code;
    controlling, by the execution engine at runtime., generation of the context specified by the context declaration, the generation of the context including determining a context abstraction based on the one or more context attributes specified in the context declaration; and
    initiating execution of the second software code within the generated context using values defined by the context abstraction.

12. The computer-readable storage medium of claim 11, wherein the process further comprises:
    analyzing the second software code, including determining at least one parameter of the first software code that is used by the second software code.

13. The computer-readable storage medium of claim 12, wherein the process further comprises:
    transporting the second software code, the at least one parameter and a value of the at least one parameter into the generated context.

14. The computer-readable storage medium of claim 11, wherein the process further comprises:
    transporting the second software code into the generated context.

15. The computer-readable storage medium of claim 11, further comprising:
  transporting the results generated by execution of the second software code into the other context.

16. The computer-readable storage medium of claim 15, wherein the process further comprises:
  executing a second portion of the first software code in the generated context after transporting the results into the generated context.

17. The computer-readable storage medium of claim 11, wherein the context declaration specifies a privilege and/or trust, and
  wherein controlling generation of the context comprises controlling generation of the context based at least in part on the specified privilege and/or trust.

18. The computer-readable storage medium of claim 11, wherein controlling generation of the context comprises determining at least one parameter to be used in the context, and initiating an identification of a predefined context based on the at least one parameter and/or a creation of the context based on the at least one parameter.

19. The computer-readable storage medium of claim 11, wherein the one or more context attributes includes one or more of a user, a machine, a process, a thread, and an application domain.

20. The computer-readable storage medium of claim 19, wherein the context abstraction defines one or more of values of variables for a stack, parameters to be passed to a function, global and/or static variables, the credentials of a process and/or a thread for the context, evidence of code to be executed in the context, tokens associated with the process or the context, environmental variables of the environment for the context, granular permissions, and the machine on which the context is to be executed.

* * * * *